(12) United States Patent
Purdy et al.

(10) Patent No.: US 12,654,857 B2
(45) Date of Patent: Jun. 16, 2026

(54) DOOR SILL PROTECTOR

(71) Applicant: Textron Aviation Inc., Wichita, KS (US)

(72) Inventors: Jason Roger Purdy, Wichita, KS (US); Jeff Bluma, Wichita, KS (US); John Rowles, Azusa, CA (US); Edward Moradians, Azusa, CA (US)

(73) Assignee: Textron Innovations Inc., Providence, RI (US)

( * ) Notice: Subject to any disclaimer, the term of this patent is extended or adjusted under 35 U.S.C. 154(b) by 388 days.

(21) Appl. No.: 18/360,887

(22) Filed: Jul. 28, 2023

(65) Prior Publication Data

US 2024/0034453 A1    Feb. 1, 2024

Related U.S. Application Data

(60) Provisional application No. 63/369,832, filed on Jul. 29, 2022, provisional application No. 63/369,730, filed on Jul. 28, 2022.

(51) Int. Cl.
*B64D 9/00* (2006.01)
*B64C 1/14* (2006.01)

(52) U.S. Cl.
CPC ............ *B64D 9/003* (2013.01); *B64C 1/1407* (2013.01)

(58) Field of Classification Search
CPC ...... B64D 9/003; B64C 1/1407; B64C 1/1415
See application file for complete search history.

(56) References Cited

U.S. PATENT DOCUMENTS

| 3,698,679 | A | * | 10/1972 | Lang ..................... | B64D 9/003 |
| | | | | | 410/69 |
| 3,964,223 | A | | 6/1976 | Sato et al. | |
| 4,470,566 | A | * | 9/1984 | Fitzgerald ............... | B64C 1/143 |
| | | | | | 292/201 |
| 4,473,201 | A | * | 9/1984 | Barnes .................. | B64C 1/1415 |
| | | | | | 292/216 |
| 4,886,413 | A | * | 12/1989 | Leon ......................... | B66F 7/08 |
| | | | | | 187/269 |
| 5,312,071 | A | | 5/1994 | Eilenstein-Wiegmann et al. | |
| 5,518,207 | A | | 5/1996 | Nordstrom et al. | |
| 5,738,199 | A | * | 4/1998 | Moradians ................ | B64C 1/20 |
| | | | | | 193/35 MD |

(Continued)

OTHER PUBLICATIONS

Main Cargo Door (MCD) Sill Protector Conversion (B727-200F), MCD Sill Protector Conversion Study, Jan. 2, 2011, 4 pages, retrieved from the Internet on Oct. 2, 2024, https://aircraft-support.blogspot.com/2011/01/main-cargo-door-mcd-sill-protector.html.

(Continued)

*Primary Examiner* — Marisa V Conlon
(74) *Attorney, Agent, or Firm* — Avek IP, LLC

(57) ABSTRACT

A door sill protector includes a base rotatably mounted to a door sill via a hinge. The hinge allows the base to be rotated between a stowed position and a deployed position. A plurality of support feet are disposed on an underside of the base. Each of the support feet is pivotable for pivoting between an extended orientation and a retracted orientation. A linkage bar is mechanically coupled to the support feet such that the support feet collectively pivot in unison between the extended orientation and the retracted orientation.

7 Claims, 5 Drawing Sheets

(56) References Cited

U.S. PATENT DOCUMENTS

| | | | |
|---|---|---|---|
| 7,429,157 B2 * | 9/2008 | Schulze | ................. B64D 9/003 |
| | | | 410/80 |
| 7,665,938 B2 | 2/2010 | Schulze | |
| 2016/0001870 A1 * | 1/2016 | Moradians | ............. B64D 9/003 |
| | | | 244/137.1 |
| 2022/0161917 A1 | 5/2022 | Chalons et al. | |

OTHER PUBLICATIONS

A330F Main Deck cargo loading FM25DAT13S00001.WMV; youtube.com video; youtube.com/watch?v=iajqm_wFJ2g; poor student for the video; accessed Oct. 28, 2025; published Sep. 22, 2011. (Year: 2011).

Aircraft Owner's & Operator's Guide: 757 Family, Aircraft Commerce, Oct./Nov. 2005, 19 pages, Issue No. 43.

FedEx 757 marks first for FedEx, National Airport, Jul. 27, 2008, American Shipper, 2 pages, retrieved from the Internet on Oct. 4, 2024, https://www.freightwaves.com/news/fedex-757-marks-first-for-fedex-national-airport.

Photograph taken of side guide in an aircraft cargo system on a conversion variant of a Boeing 757 made publicly available at least by 2008.

* cited by examiner

DOOR SILL PROTECTOR

CROSS-REFERENCE TO RELATED APPLICATIONS

This application claims the benefit of priority of U.S. Provisional Patent Application No. 63/369,832, entitled Door Sill Protector and filed on Jul. 29, 2022, and U.S. Provisional Patent Application No. 63/369,730, entitled Doorway Side Guide System and filed on Jul. 28, 2022, the disclosures of which are both herein incorporated by reference in their entirety.

BACKGROUND

1. Field

Embodiments of the disclosure relate to door entryways, and in particular to door sills for cargo loading doors.

2. Related Art

Door sill devices are known in the prior art. For example, U.S. Pat. No. 5,518,207 to Nordstrom et al. discloses an aircraft door sill guard with protective feet that lock to the door sill once the guard is deployed. U.S. Patent Application Publication No. 2022/0161917 to CHALONS et al. discloses a door sill protection system wherein a flat door sill protector may be nested into cavities in the door sill. U.S. Pat. No. 3,964,223 to Sato et al. discloses a flexible door sill protector for aircraft cargo chambers. U.S. Pat. No. 5,312, 071 to Eilenstein-Wiegmann et al. discloses a hinged plate that rotates between a stowed and deployed position to protect a door sill on a cargo aircraft.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a door sill protector includes a base rotatably mounted to a door sill via a hinge, wherein the hinge allows the base to be rotated between a stowed position and a deployed position; a plurality of support feet disposed on an underside of the base, wherein each of the support feet is pivotable for pivoting between an extended orientation and a retracted orientation; and a linkage bar mechanically coupled to the support feet such that the support feet collectively pivot in unison between the extended orientation and the retracted orientation.

In another embodiment, a door sill protector for an aircraft cargo door includes a platform rotatably mounted on an aircraft floor inside a cargo doorway, wherein the platform is configured to rotate via a hinge between an upright stowed position inside the cargo doorway and a horizontal deployed position extending outside of the cargo doorway; a plurality of support feet disposed on an underside of the platform, wherein each of the support feet is pivotable for pivoting between an extended orientation and a retracted orientation; and a plurality of biasing members each operatively coupled to a respective one of the support feet, wherein upon the aircraft cargo door being opened, the biasing members bias the support feet to the extended orientation for supporting the platform in the horizontal deployed position.

BRIEF DESCRIPTION OF THE DRAWING FIGURES

Embodiments of the invention are described in detail below with reference to the attached drawing figures, wherein.

Figure 3:
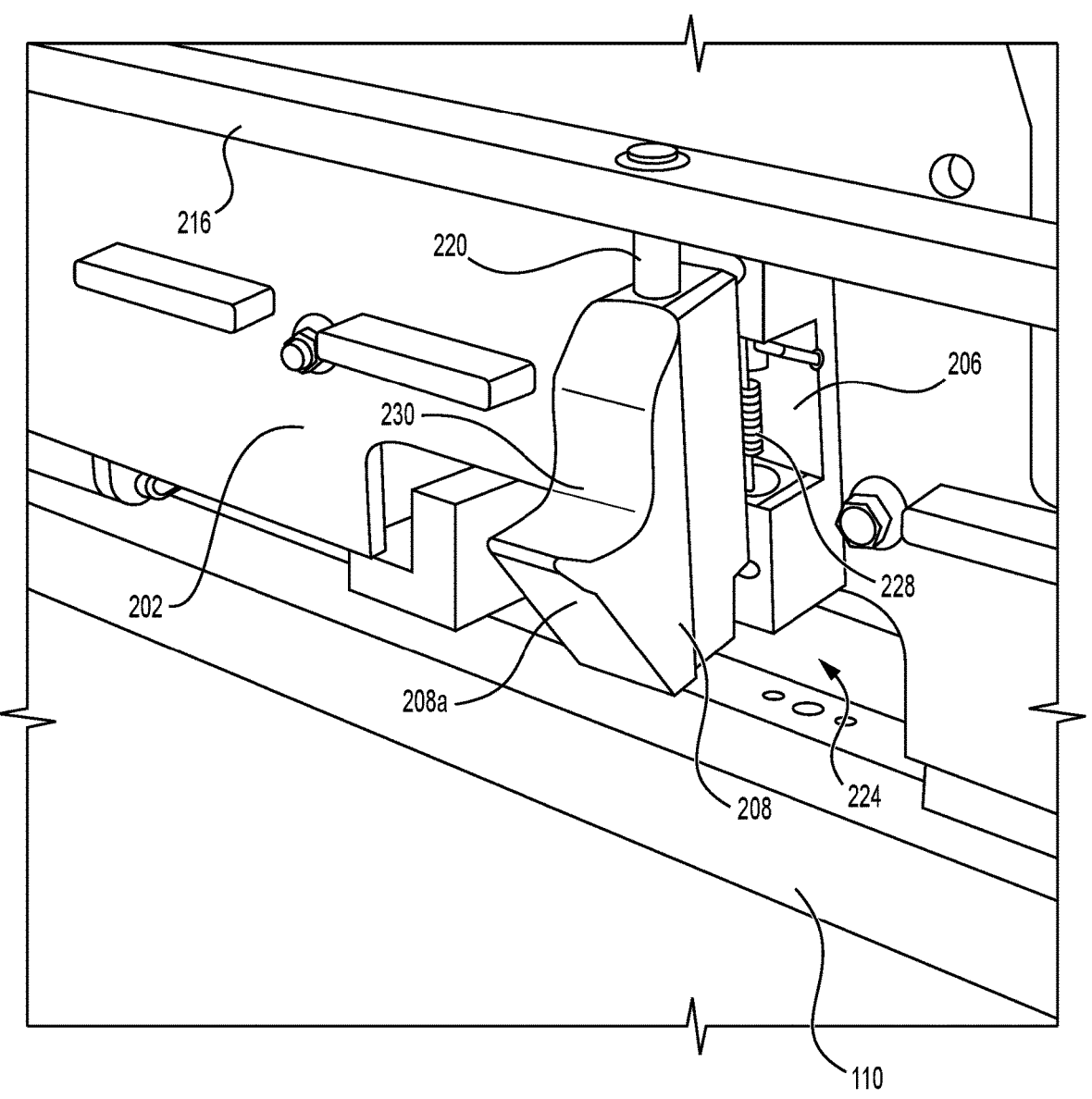
Figure 4:
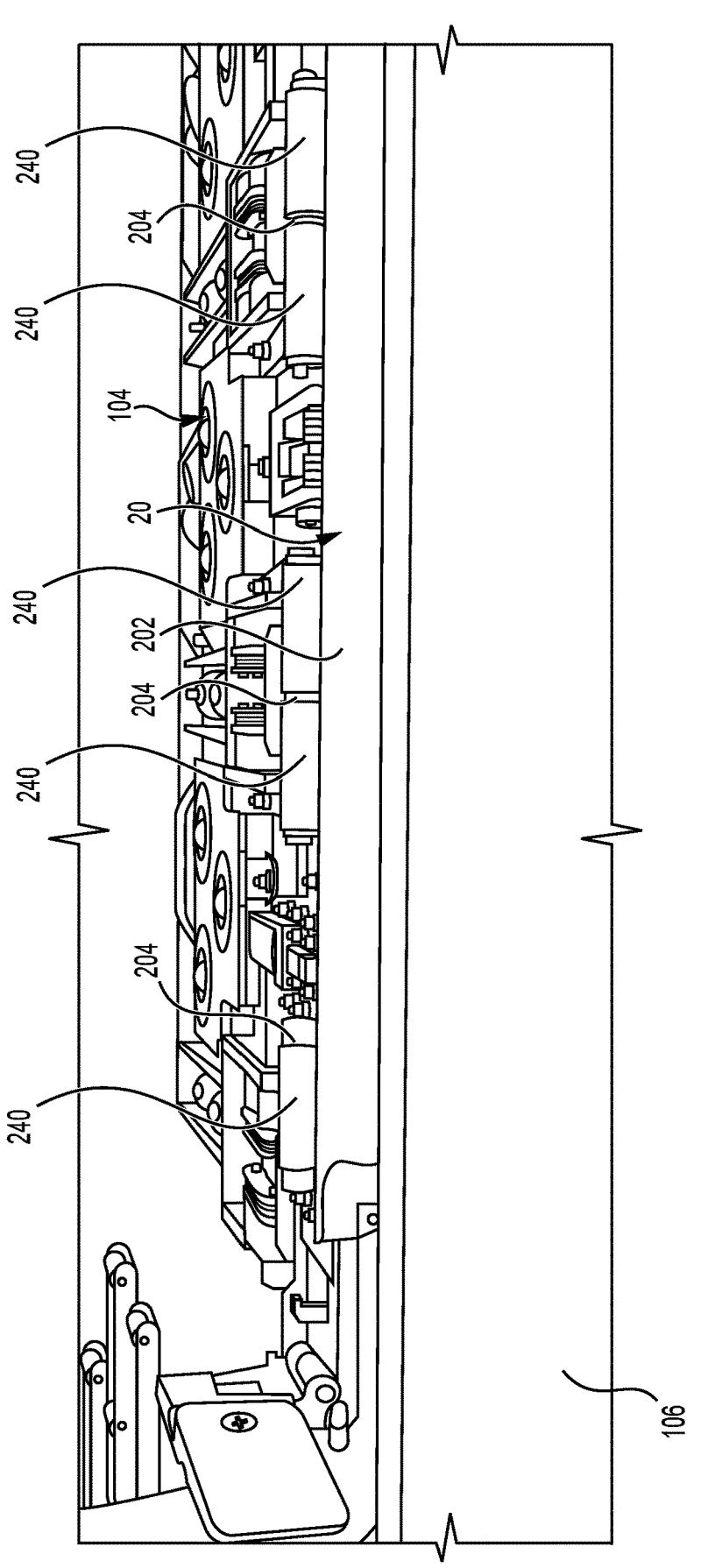

FIG. 3 demonstrates the features of a support foot on a door sill protector; and FIG. 4 depicts a deployed door sill protector.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

On cargo-carrying aircraft, door sill protection systems are often included to provide damage protection for the door sill from loading/unloading of cargo containers. They can also be used to ease the loading of cargo onto an aircraft, for instance by providing an interface between a cargo platform and an aircraft doorway.

In embodiments, a door sill protector for aircraft cargo doors is provided. As used herein, the term "door sill" refers to a bottom surface of a doorframe within a doorway opening. The door sill protector comprises a base configured to rotate between a stowed position above a door sill and a deployed position. An operator manually moves the door sill protectors between the stowed and deployed positions. In the stowed position, the door sill is positioned out of the way of the doorframe so that the door may close. In the deployed position, the door sill covers a portion of the door sill at the bottom of the doorframe, extending substantially outward from the doorframe to aid in the loading of cargo from any platform adjacent to the door. Support feet at the bottom of the door sill protector hold it in place when deployed. The door sill protector contains a novel mechanical setup that automatically moves the support feet out of the way of the door when the door is being closed.

When the door is open, the door sill protector may be lowered. Support feet are conveniently disposed at the bottom of the door sill protector so that the door sill protector can simply be lowered by hand to be deployed with no other operator input required. The support feet are configured to rest against the door sill when the door sill protector is deployed, and they hold the door sill protector level with the interior floor of the aircraft. The top of the door sill protector is flat such that when the door sill protector is deployed, a continuous flat surface is provided for sliding cargo pallets. This makes transfer of cargo from an external platform into the cargo bay of the aircraft easy. By extending out of the door and covering the doorframe, the door sill protectors also provide an easy point of contact for any loading platform being brought up beside an aircraft while hindering any loading platform from coming into contact with the doorframe during normal operations, thereby preventing damage to the doorframe.

To close the door of the aircraft, any deployed door sill protectors must be manually raised to the stowed position. Once they are raised, the door may be closed. A roller is disposed on the door sill protector such that it is the first and only element of the door sill protector that contacts the door during door closure. Once the door contacts the roller during door closure, the roller moves along a pivot. The roller is disposed on an arm that is part of a mechanical linkage connected to the support feet such that the support feet move with the roller, moving the support feet out of the way of the closing door. In this manner, the support feet neither block the door from closing nor cause damage to the door.

Figure 1:
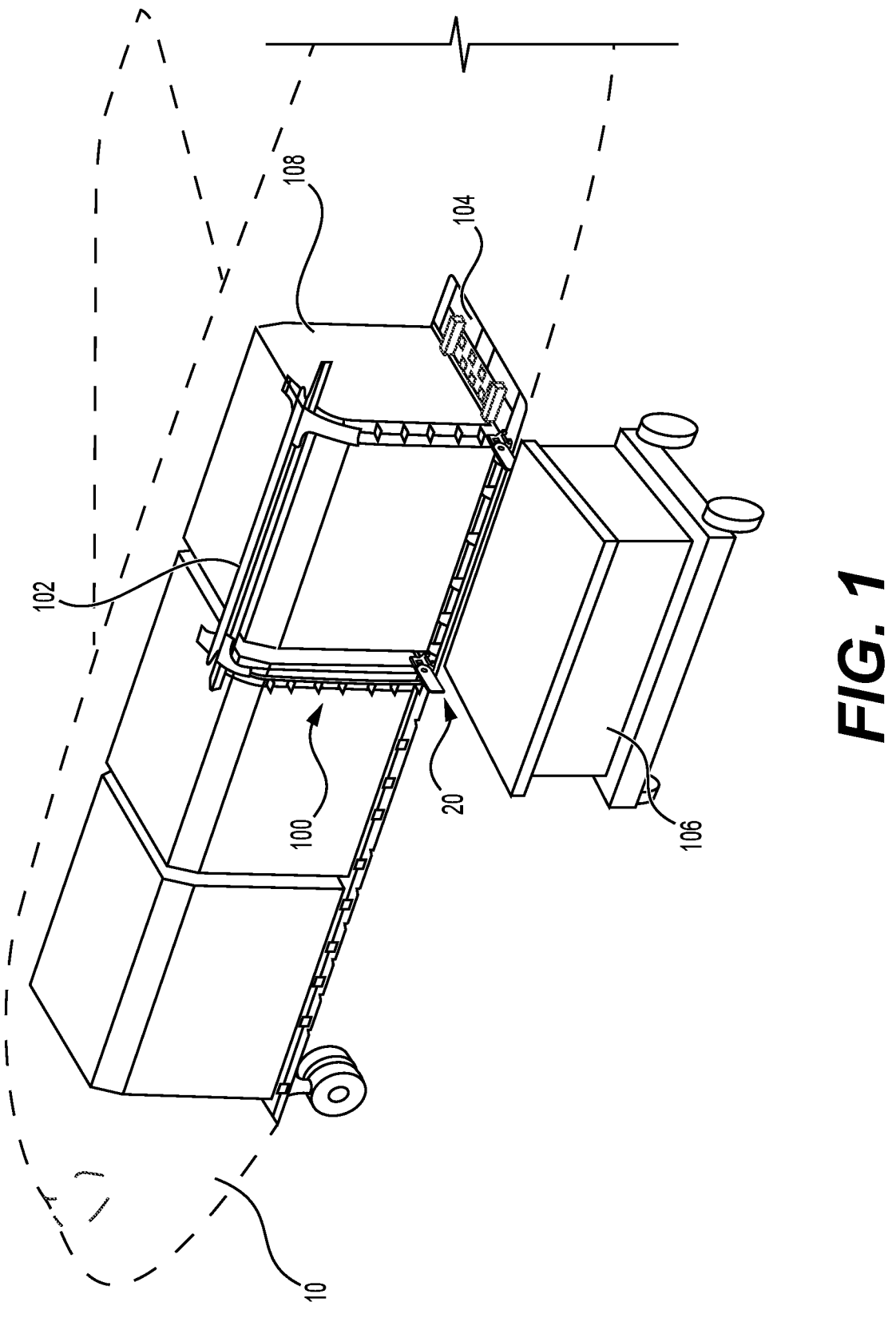
FIG. 1 depicts a cargo plane having a door sill protector, in an embodiment.

FIG. 1 shows an outline of portions of an exemplary aircraft 10. Aircraft 10 includes a cargo doorway 100 suitable for the loading of cargo 108 onto aircraft 10. Cargo doorway 100 is configured to receive a cargo door (not shown) that may be opened or closed. Cargo 108 may comprise a cargo container or pallet of cargo, for example. Cargo 108 is supported underneath by a floor 104 of aircraft 10 when loaded onboard. When cargo doorway 100 is open, a platform 106 may be raised such that a top surface of platform 106 is level with a bottom of a doorframe 102 of cargo doorway 100, which enables cargo 108 to be easily loaded or unloaded by wheeling cargo 108 on or off aircraft 10. As such, platform 106 is placed very near or next to an outer edge along a bottom portion of doorframe 102, referred to herein as a door sill 110.

Figure 2A:
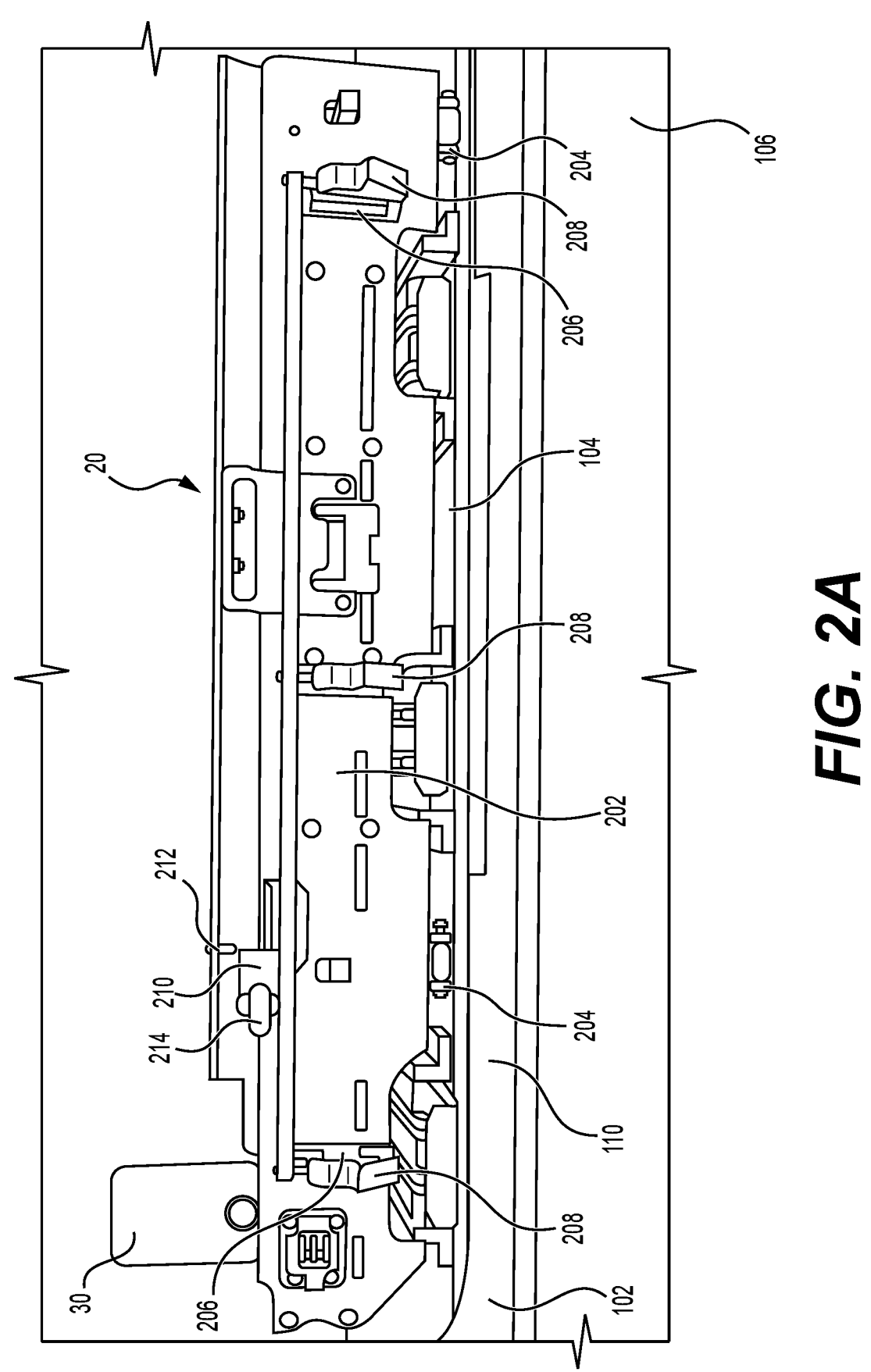
FIG. 2A is a front-on view of an embodiment door sill protector.

FIG. 2A illustrates an exemplary door sill protector 20 in a stowed position. Door sill protector 20 is disposed directly adjacent to door sill 110. In embodiments, door sill protector is mounted to floor 104 via hinges 204. Hinges 204 allow door sill protector 20 to rotate upwardly with respect to floor 104, which allows door sill protector 20 to be stowed. In a stowed position, door sill protector 20 is perpendicular to floor 104 as best viewed in FIG. 2A. In a deployed position, door sill protector 20 is parallel to floor 104 and covers a portion of door sill 110 as best viewed in FIG. 4.

Door sill protector 20 comprises a base 202 made of a stiff material such as a metal, metal alloy, or composite material, for example. Support mounts 206 are mechanically coupled to an underside of base 202 for supporting support feet 208 to the underside of base 202. As shown in the drawing figures, three support mounts 206 support three support feet 208, respectively; however, fewer or greater than three support mounts 206 and their respective support feet 208 may be employed without departing from the scope hereof.

In embodiments, side guides 30 are mounted on door sill protector 20. Side guides function as guides and protective contacts for any cargo 108 entering cargo doorway 100, such that misaligned cargo 108 does not collide with and damage doorframe 102. Side guides 30 may be disposed at both sides of the door, on separate door sill protectors 20, or they may otherwise be mounted to the aircraft, such as on the doorframe, on the aircraft floor, or elsewhere.

Figure 2B:
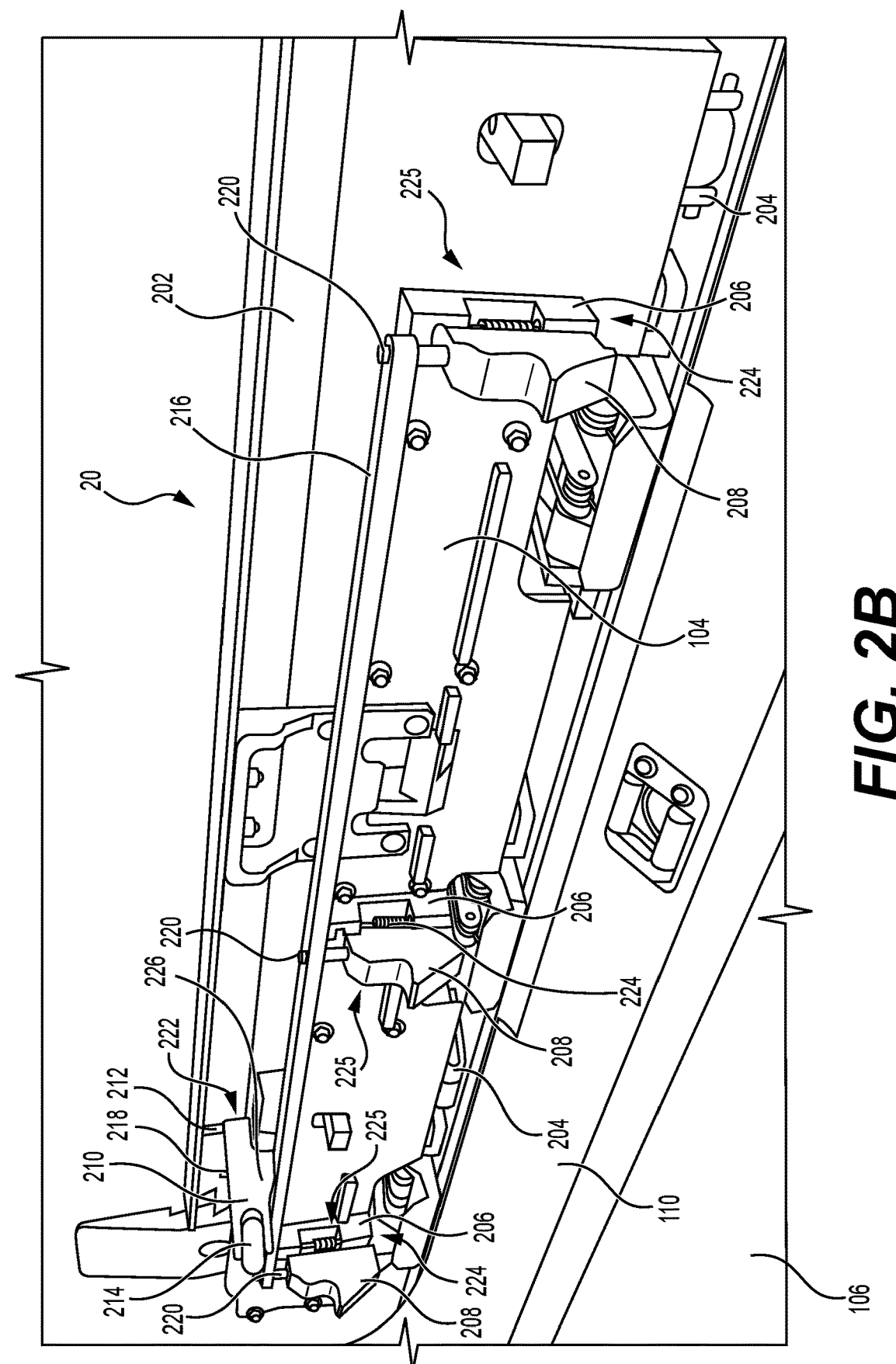
FIG. 2B is an angled view of an embodiment door sill protector.

FIG. 2B provides a perspective view showing door sill protector 20 in the stowed position. In embodiments, a linkage bar 216 couples together movement of the support feet 208. Specifically, a pivot post 220 is pivotally coupled to each support foot 208 and pivotally coupled to linkage bar 216 such that when linkage bar 216 is moved, pivot post 220 pulls support feet 208 to rotate each support foot 208 about a hinge 224. Mounts 206 are mechanically coupled (e.g., bolted) to base 202 and are each configured to support a respective hinge 224. An arm 210 is mechanically coupled to base 202 via a pivot 212. A wheel 214 may be mounted on arm 210 such that wheel 214 extends substantially away from base 202. Wheel 214 may be a roller or other type of rolling mechanism having an axel configured to spin. Arm 210 is coupled to linkage bar 216 via a hinge 218. Therefore, arm 210 acts as a double hinge 222 comprising pivot 212 and hinge 218. Similarly, each support foot 208 acts as a double hinge 225 comprising support hinge 224 and pivot post 220. Double hinges 222 and 225 allow for a system such that, when linkage bar 216 is translated (e.g., pushed towards base 202), arm 210 and support feet 208 rotate in unison with respect to base 202.

In operation, linkage bar 216 is actuated when wheel 214 is contacted by the cargo door as the cargo door is closed. In embodiments, arm 210 comprises a bend 226 (see FIG. 2B) that predisposes wheel 214 to be pushed in a preferred direction every time the cargo door is closed, meaning that arm 210 rotates in the same direction every time linkage bar 216 is actuated. As arm 210 is rotated, linkage bar 216 is translated due to it being coupled with arm 210 at hinge 218. Support feet 208 rotate as linkage bar 216 is translated, rotating the support feet 208 towards the base 202 of door sill protector 20. The actuation via linkage bar 216 moves support feet 208 out of the way of the cargo door, allowing the cargo door to close. When the cargo door is opened, the pressure of the door is removed from wheel 214 until the door no longer contacts cargo doorway 100. Biasing members 228 (see FIG. 3) are disposed on each mount 206 to bias the rotation of support feet 208 back outward and away from base 202 when linkage bar 216 is neither actuated nor otherwise pressed upon. Biasing members 228 may comprise torsional springs or leaf springs, for example. In embodiments, one or more biasing members may be disposed about hinges of base 202 to assist with raising of door sill protector 20 into the stowed position and to assist with a soft lowering of door sill protector 20 into the deployed position as shown in FIG. 4.

FIG. 3 shows an exemplary support foot 208 and associated components. In embodiments, support foot 208 comprises an angled surface 208a that rests upon the bottom edge of doorframe 102 when door sill protector 20 is in the deployed position. The angle of the angled surface 208a is configured to match an angle of the door sill 110 when deployed. A notched portion 230 may be provided on support foot 208 to reduce weight. Support foot 208 is held in the deployed position by biasing member 228 on mount 206. When linkage bar 216 is actuated (e.g., when the cargo door presses on wheel 214), support foot 208 is rotated until support foot 208 is approximately parallel to base 202 and disposed out of the way of the cargo door.

FIG. 4 shows door sill protector 20 in the deployed position. A topside of base 202 provides a substantially flat surface level with floor 104. Platform 106 is raised to the level of floor 104, and the flat surface of platform 106 is level with floor 104. The flat surface of base 202 being substantially level with floor 104 and bridging any gap to platform 106 facilitates the movement of cargo to and from aircraft 10 through cargo doorway 100. A plurality of rollers 240 may be disposed on a top side of base 202 when door sill protector 20 is deployed. For example, the rollers 240 may be disposed adjacent hinges 204 such that the rollers 240 remain stationary while deploying/stowing the door sill protector 20. The rollers 240 also facilitate the movement of cargo to and from aircraft 10 through cargo doorway 100 while protecting the hinges 204.

Because door sill protector 20 extends outward from cargo doorway 100 when in the deployed position, any platform 106 does not need to be brought into contact with doorframe 102 or door sill 110 for cargo loading, which obviates potential damage to aircraft 10 and cargo doorway 100. Therefore, during normal operation, platform 106 may be translated horizontally to reach cargo doorway 100. In the event of contact during horizontal translation, platform 106 would contact door sill protector 20 before touching doorframe 102, thereby preventing damage to the aircraft. In another instance, platform 106 may be raised up to the level of floor 104 to initiate cargo loading. Without door sill protectors 20 deployed, platform 106 may be raised so that it is positioned next to door sill 110 once fully raised. In the event of error or misplacement of platform 106, platform 106 may contact the underside of aircraft 10 or door sill 110 while being raised, causing damage to aircraft 10. With door sill protectors 20 deployed, platform 106 may be raised so that it is positioned next to the edge of door sill protector 20 once fully raised. If door sill protector 20 is accidentally contacted while raising platform 106, door sill protector 20 may be pushed upwards and inwards thereby preventing damage.

A plurality of door sill protectors 20 may be disposed on a door sill 110. The door sill protectors 20 may be disposed such that, when all door sill protectors 20 are in a deployed position, there is a continuous flat surface with a minimal gap, for example, a gap of less than one inch, between the door sill protectors 20. Door sill protectors 20 may also be disposed at or near the edge of the doorframe with a minimal gap, for example, a gap of less than three inches, so that a maximal width of cargo doorway 100 can be used when loading of wheeled cargo across the surface of door sill protectors 20 into aircraft 10.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A door sill protector comprising:
   a base;
   a hinge configured for rotatably mounting the base to a door sill, wherein the hinge is configured to allow the base to be rotated between a stowed position and a deployed position, wherein the base extends outwardly above the door sill in the deployed position thereby protecting the door sill and providing a substantially flat surface that extends outside of a doorway for assisting with loading and unloading of cargo;
   a plurality of support feet disposed on an underside of the base, wherein each of the support feet is pivotable for pivoting between an extended orientation and a retracted orientation, wherein the support feet are pivoted to the retracted orientation when the base is in the stowed position such that the support feet are inside of the doorway thereby enabling closing of a door in the doorway;
   a linkage bar mechanically coupled to the support feet such that the support feet collectively pivot in unison between the extended orientation and the retracted orientation; and
   a wheel coupled to the linkage bar, wherein upon the base being in the stowed position, the wheel extends outside of the doorway via an arm such that the wheel contacts the door as the door is being closed thereby actuating the linkage bar to automatically pivot the support feet to the retracted orientation.

2. The door sill protector of claim 1 wherein upon the base being deployed, the support feet are pivoted to the extended orientation for supporting the base by resting on the door sill.

3. The door sill protector of claim 1 wherein the base extends upwardly inside of the doorway in the stowed position thereby enabling closing of a door in the doorway.

4. The door sill protector of claim 1 comprising a plurality of biasing members each operatively coupled to a respective one of the support feet, wherein upon the door being opened, the biasing members bias the support feet to the extended orientation.

5. The door sill protector of claim 1 wherein each of the support feet comprises an angled surface configured to rest upon the door sill.

6. The door sill protector of claim 1 wherein upon the base being contacted by an upwardly moving platform, the base is configured to rotate upwards and inwards via the hinge thereby avoiding damage to the base.

7. A door sill protector for an aircraft cargo door comprising:
   a platform configured for rotatably mounting onto an aircraft floor inside a cargo doorway;
   a hinge configured for operably coupling the platform to the aircraft floor, wherein the hinge is configured for rotating the platform between an upright stowed position inside the cargo doorway and a horizontal deployed position extending outside of the cargo doorway;
   a plurality of support feet disposed on an underside of the platform, wherein each of the support feet is pivotable for pivoting between an extended orientation and a retracted orientation, and upon the platform being in the horizontal deployed position, the support feet are pivoted to the extended orientation for supporting the platform by resting adjacent an outer edge of the cargo doorway along a bottom portion of the cargo doorway;
   a linkage bar mechanically coupled to the support feet such that the support feet collectively pivot in unison between the extended orientation and the retracted orientation; and
   a wheel coupled to the linkage bar, wherein upon the platform being in the stowed position, the wheel extends outside of the cargo doorway via an arm such that upon the aircraft cargo door being closed, the wheel contacts the door thereby actuating the linkage bar to automatically pivot the support feet to the retracted orientation.

* * * * *